M. P. HALL.
Drag-Saws.
No. 223,504. Patented Jan. 13, 1880.
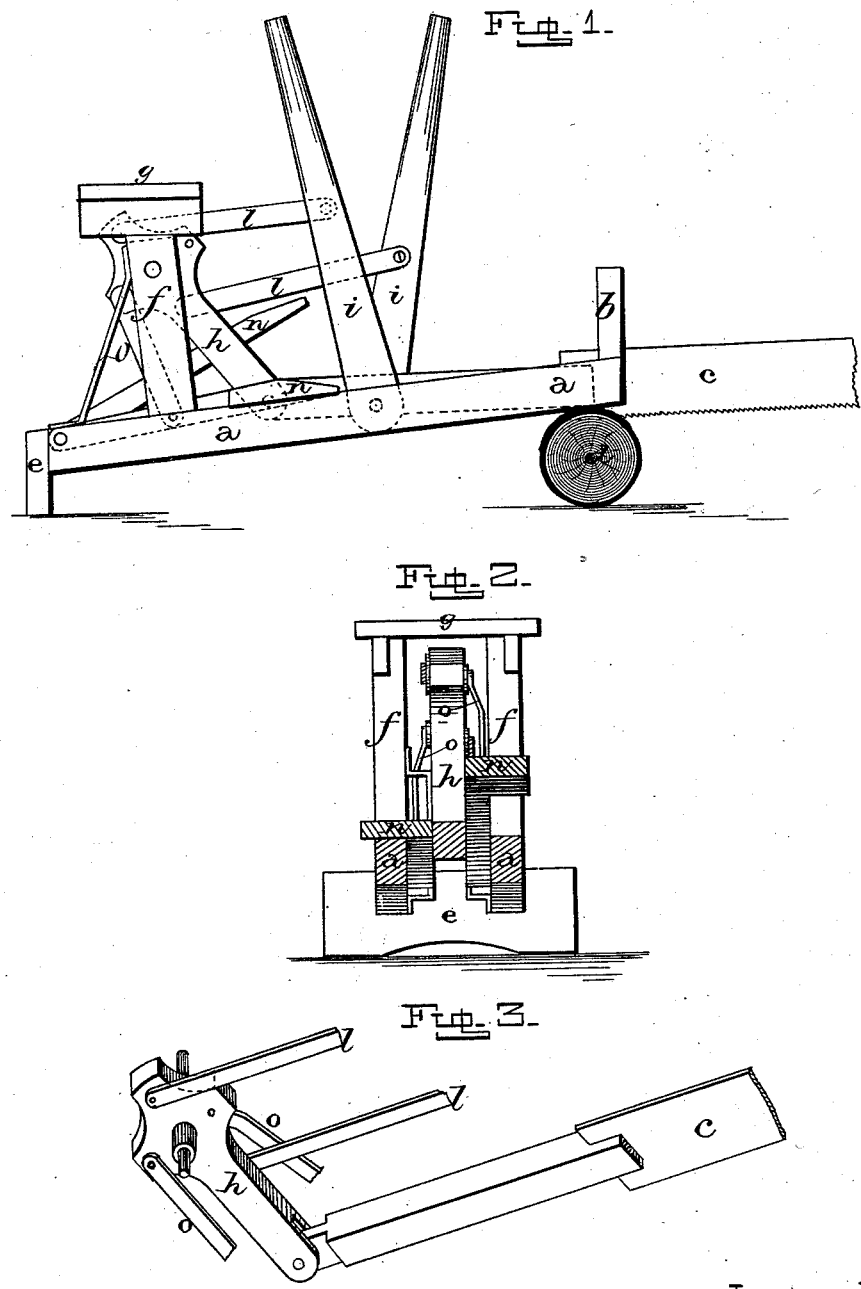
Witnesses:
J. W. Garner
W. S. D. Haines
Inventor:
Moses P. Hall,
per
F. A. Lehmann,
Att'y

UNITED STATES PATENT OFFICE.

MOSES P. HALL, OF HINSDALE, NEW YORK.

DRAG-SAW.

SPECIFICATION forming part of Letters Patent No. 223,504, dated January 13, 1880.

Application filed December 4, 1879.

*To all whom it may concern:*

Be it known that I, MOSES P. HALL, of Hinsdale, in the county of Cattaraugus and State of New York, have invented certain new and useful Improvements in Sawing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in sawing-machines; and it consists in pivoting an operating-lever between the two standards upon which the stationary seat is placed, and connecting to the lower end of this lever the drag-saw by means of a pitman, the lever being operated both by hand-levers and foot-treadles, which are pivoted to the frame and connected to the operating-lever by means of connecting-rods, as will be more fully described hereinafter.

Figure 1 is a side elevation of my invention. Fig. 2 is a vertical cross-section of the same. Fig. 3 is a perspective of the operating-lever and its connecting parts.

The frame consists of the two parallel beams *a*, which are secured together at their front ends by the connecting-piece *b*, which has a vertical slit in its lower edge to guide the saw *c*. This front end of the frame is secured to the log *d* by two sharp spikes on the under side of the frame, so as to hold the frame securely in place.

The two beams *a* are secured together by means of the support *e* at their rear ends, which support raises the frame a suitable distance above the ground.

Near the rear end of the frame are the two uprights *f*, which are suitably braced in position, and upon the top of which is secured the stationary seat *g* for the operator. Hung upon suitable journals in these two uprights is the operating-lever *h*, which has the rear end of the saw connected to it by means of a pitman, so that when the lever is rocked back and forth upon its pivots it moves the saw with it.

Pivoted to the inside or outside of the frame, at any convenient distance in front of the seat, are the two hand-levers *i*, both of which are connected with the operating-lever, one above and the other below its pivot, by means of the connecting-rods *l*. Also, pivoted to the inside of the frame, at its rear end, are the two treadles *n*, which extend forward a suitable distance beyond the front edge of the seat, and both of them are connected by the rods *o* with the opposite sides or cross-arms of the operating-lever, one rod being fastened in front and the other behind the lever's pivot.

In operating my machine, the hand-levers are alternately drawn toward and pushed from the operator as he sits on the seat, and as he pulls either lever toward him he presses down upon the treadle upon that side as he pushes the lever on the other side away from him, and as he pushes the lever away the treadle on that side rises upward.

By means of these compound levers and treadles the saw can be worked easily and rapidly for cutting lumber of all kinds in two. The whole combination forms a complete mechanical movement for operating not only sawing-machines, but for other useful purposes.

Having thus described my invention, I claim—

In a sawing-machine, the combination of the frame *a*, having the hand-levers and treadles pivoted thereto, the rocking lever pivoted in the seat-standards, and connected to the treadles in front and back of its pivot, and to the hand-levers above and below its pivot, by suitable connecting-rods, substantially as shown, the saw being operated by the rocking lever, as described.

In testimony that I claim the foregoing I have hereunto set my hand and seal this 26th day of November, 1879.

MOSES PORTER HALL. [L. S.]

Witnesses:
DAVID HOOPER,
A. T. NELSON.